(12) United States Patent
Koudil et al.

(10) Patent No.: US 8,350,071 B2
(45) Date of Patent: Jan. 8, 2013

(54) DECANTATION IMPROVEMENT IN A METHOD OF PRODUCING ALKYL ESTERS FROM VEGETABLE OR ANIMAL OIL AND AN ALIPHATIC MONOALCOHOL

(75) Inventors: Abdelhakim Koudil, Lyons (FR); Romain Rousset, Oullins (FR); Laurent Bournay, Chaussan (FR); Franck Gaviot-Blanc, Moidieu Detourbe (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 245 days.

(21) Appl. No.: 12/666,885

(22) PCT Filed: Jun. 9, 2008

(86) PCT No.: PCT/FR2008/000782
§ 371 (c)(1),
(2), (4) Date: Jun. 15, 2010

(87) PCT Pub. No.: WO2009/007529
PCT Pub. Date: Jan. 15, 2009

(65) Prior Publication Data
US 2010/0292493 A1 Nov. 18, 2010

(30) Foreign Application Priority Data
Jun. 29, 2007 (FR) .................................. 07 04711

(51) Int. Cl.
*C11C 3/00* (2006.01)
(52) U.S. Cl. ........................................ 554/169; 422/198
(58) Field of Classification Search .................. 554/169; 422/198
See application file for complete search history.

(56) References Cited

U.S. PATENT DOCUMENTS

| 5,908,946 A | 6/1999 | Stern et al. |
| 6,878,837 B2 | 4/2005 | Bournay et al. |
| 2006/0014974 A1 | 1/2006 | Bournay et al. |
| 2006/0076271 A1 | 4/2006 | Bournay et al. |

FOREIGN PATENT DOCUMENTS

| EP | 1 616 853 A1 | 1/2006 |
| FR | 2 752 242 A1 | 2/1998 |
| FR | 2752242 A * | 2/1998 |
| GB | 2 174 697 A | 11/1986 |
| GB | 2174697 A * | 11/1986 |
| WO | WO 2006/127839 A2 | 11/2006 |
| WO | WO 2006127839 A2 * | 11/2006 |

OTHER PUBLICATIONS

International Search Report of PCT/FR2008/000782 (Feb. 4, 2009).

* cited by examiner

*Primary Examiner* — Deborah D Carr
(74) *Attorney, Agent, or Firm* — Millen, White, Zelano & Branigan, P.C.

(57) ABSTRACT

The present invention describes a method of producing fatty acid alkyl esters and glycerin implementing, in a reaction section, a set of transesterification reactions between a vegetable or animal oil and an aliphatic monoalcohol, and using a heterogeneous solid catalyst, comprising:
  a) a stage of recontacting the effluent coming from the reaction section, and separated from the excess alcohol, with a glycerin phase,
  b) a stage of mixing said effluent with said glycerin phase, and
  c) a glycerin phase decantation stage.

The supernatent ester phase obtained after decantation is then optionally sent to a coalescer, also allowing separation of the glycerin, then to a purification stage by adsorption on solids.

17 Claims, 3 Drawing Sheets

DECANTATION IMPROVEMENT IN A METHOD OF PRODUCING ALKYL ESTERS FROM VEGETABLE OR ANIMAL OIL AND AN ALIPHATIC MONOALCOHOL

FIELD OF THE INVENTION

The invention relates to an improved method of producing alkyl esters from vegetable or animal oils and an aliphatic monoalcohol.

BACKGROUND OF THE INVENTION

Vegetable oil alkyl esters intended to be used as biofuel are produced from vegetable oils obtained for example from rapeseed, sunflower, soybean or even palm. Ill-suited for directly feeding modern diesel engines of private cars, vegetable oils essentially consisting of triglycerides have to be converted by means of a transesterification reaction with an alcohol, methanol or ethanol for example, introduced in excess to produce vegetable oil methyl esters (VOME) and glycerin.

What is referred to as glycerol is the pure body of chemical formula $C_3H_8O_3$ and glycerin or glycerin phase is understood to be a mixture predominantly containing glycerol and other impurities, such as water, methanol, mono-, di- and triglycerides for example, mono- and diglycerides being triglycerides partly converted by the transesterification reaction.

The Esterfip-H™ process developed by IFP allows to obtain a biodiesel and a glycerin of very good quality, with high yields. The flowsheet of this process consists of two fixed-bed transesterification reactors using a solid heterogeneous catalyst, operating on a continuous basis and arranged in series, which allows conversion to be maximized. The effluent from the first reactor is subjected to partial evaporation so as to remove the excess methanol introduced and thus to promote separation of the glycerin formed while favourably shifting the reaction equilibrium in order to maximize conversion in the second reactor. After the second transesterification reaction, the major part of the excess methanol is removed by evaporation (more than 99%) and recycled. The insoluble glycerin is eliminated by decantation and a final methyl ester purification stage consists in removing the soluble glycerin by passage through a column filled with a selective adsorbent. The water content of the reaction medium is controlled so as to remain below a given limit value as described in U.S. Pat. No. 6,878,837 filed by the applicant.

The current European standard EN 14,214 for biofuels sets maximum methanol, water, free glycerol, mono-, di- and triglyceride contents: 0.2% by mass for methanol, 500 mg/kg for water, 0.02% by mass free glycerol, 0.8% by mass monoglycerides, 0.2% by mass di- and triglycerides.

Free glycerol, as opposed to bonded glycerol, is defined as a glycerol molecule totally detached from any carbon chain and of formula $C_3H_8O_3$.

Glycerol is referred to as bonded when the functional group of glycerol $C_3H_8O_3$ is alkylated to one or more fatty acid chains giving monoglyceride, diglyceride or triglyceride molecules.

In the Esterfip-H™ process diagrammatically shown in FIG. 1 as described in the prior art, stream A at the reaction section outlet predominantly contains methyl esters, methanol, glycerol and partly converted glycerides (monoglycerides, diglycerides and triglycerides), as well as water as traces, an impurity present in the feed. The conversion reached in this reaction section (two reaction stages with an intermediate stage of separation of the glycerin coproduced) allows to obtain partial glyceride contents compatible with the European standard for biodiesel.

It is well known to the person skilled in the art that, in the presence of two products P1 and P2 partly soluble in one another in the liquid state, an equilibrium referred to as solubility equilibrium is established. Thus, if a certain amount of these two products is brought together in a container, two separate liquid phases are obtained, one predominantly containing constituent P1 and part of P2, and the other predominantly containing constituent P2 and part of P1. The two liquid phases stratify in the container according to their respective density through a decantation effect. The solubility equilibrium defined by the proportion of product P1 in the phase predominantly containing P2 and, conversely, the proportion of product P2 in the phase predominantly containing P1 depends on the amounts of P1 and P2 in the initial mixture, on the temperature and on the presence of a body P3 that can act as a co-solvent, i.e. increase the concentration of one of the products in the phase predominantly containing the other.

In the particular case of the Esterfip-H™ process, the methyl esters and the glycerol are very poorly soluble and the methanol acts as a co-solvent. Thus, the higher the temperature and the higher the methanol content, the higher the glycerol content of the ester phase.

Besides, pure glycerol has a density close to 1.2 g·cm$^{-3}$, whereas the density of the ester is around 0.9 g·cm$^{-3}$. In the presence of a small proportion of methanol, the phase predominantly containing glycerol is therefore denser than the ester phase and it thus tends to come below the latter under the effect of gravity. The ester phase thus is the supernatent phase.

Separation of the methanol from stream A from the reaction section (not shown in the figure) is achieved by evaporation in two stages, the second one under vacuum, in order to reach methanol and water contents allowed by the standard (zone (1) in FIG. 1), stream B corresponding to the evaporated methanol. The methanol acting as a co-solubilizing agent for the methyl esters and the glycerol, this evaporation stage makes part of the glycerol present in this stream, in a proportion ranging between 0.1 and 5% by mass, insoluble. The soluble part represents, at ambient temperature, 500 to 700 ppm mass, the allowable maximum content set by the European standard being 200 ppm mass of free glycerol. Both the insoluble glycerol and part of the soluble glycerol therefore have to be separated. This separation is carried out in several stages.

Stream C from the evaporation stage is at a temperature ranging between 80° C. and 180° C., preferably between 120° C. and 160° C. In order to lower the proportion of glycerol dissolved in this stream, the first stage consists in reducing its temperature in a heat exchanger (2). At the outlet of this exchanger, stream D of same composition as stream C, but at a lower temperature ranging between 10° C. and 100° C., preferably between 35° C. and 75° C., consists in a very large measure of an ester phase referred to as continuous and of 0.01 to 10% by mass glycerol, and preferably 0.5 to 5% by mass insoluble glycerol dissolved in the ester phase.

The insoluble glycerin phase is often dispersed in form of droplets. These droplets can form as the insoluble glycerin phase appears. They can also divide in rotating machines, control valves or any other equipment of the process wherein the fluid reaches high velocities, thus causing strong agitation. The insoluble glycerin phase thus consists of a population of many droplets of different sizes.

Separation of the glycerin phase occurs then through gravity decantation. This stage consists in sending this stream to a decanter drum 3 whose function is to allow the glycerin phase droplets, denser than the ester phase, to fall under the effect of gravity.

In general terms, the size of the decanter drum and the residence time of the feed in this device define the cleavage threshold of the decanter. The cleavage threshold is expressed in µm and it corresponds to the minimum drop size that can be separated by decantation in the drum. Below this threshold, the droplets do not settle rapidly enough in the decanter and they are carried along with the ester phase in the next stages of the process. Now, too long decantation times require longer effluent immobilization, thus leading to expensive overstocking and losses as regards the process profitability.

If the cleavage threshold is around 100 µm, the decantation times are fast, of the order of less than one hour (<<Extraction liquide-liquide>>), Description des appareils, J. Leybros, Techniques de l'ingénieur, Traité génie des procédés, J2764). If the cleavage threshold is below 10 µm, the decantation times become very long and the cost of the facility is significantly increased.

The decanter drum can come in form of a capacity of cylindrical shape whose axis of symmetry is horizontal. Stream D containing the ester with glycerin phase drops is injected at one end of the drum. Two outlets are arranged at the other end of the drum; one is located on the upper generatrix and intended to collect the supernatent ester phase, the other is located at the bottom of the decanter drum and intended to collect the glycerin phase. The ester stream containing the glycerin droplets is thus going to flow through the decanter drum horizontally from the inlet to the outlets at a velocity depending on the section and therefore on the diameter of this drum. During this horizontal flow, the glycerin drops tend to fall, under the effect of gravity, towards the bottom of the decanter drum where they coalesce, i.e. they gather to form a continuous glycerin phase that can be withdrawn (stream F). The ester phase depleted in glycerin drops is withdrawn at the top of the drum (stream E).

This separation by gravity decantation is not sufficient and the droplets of smaller size are still carried along to the next stages of the process. In the Esterfip-H™ process, ester stream E leaving the decanter is sent to a coalescer (4). This equipment allows the glycerin droplets whose size was not large enough for decanting in the previous stage and that were consequently carried along at the decanter outlet to meet so as to form larger droplets that can then settle efficiently. Glycerin phase stream G is withdrawn at the bottom point of the coalescer. In theory, at the outlet of this equipment, ester stream H contains no more insoluble glycerin. However, too large a proportion of glycerin carried along at the decanter outlet upstream increases the coalescence difficulty and requires using a bigger equipment, which will therefore require a larger amount of steel and bigger tools. It will therefore be more expensive.

Coalescers are systems allowing the size of fine droplets to be increased by promoting the coalescence phenomenon, i.e. the formation of larger droplets (Perry's Chemical Engineers' Handbook, 7$^{th}$ Edition, Chp 15-17 "Liquid-liquid extraction equipment"). Once bigger, the droplets can be separated more easily by decantation for example. Coalescers are fibrous or porous solid beds whose properties are selected depending on the system to be separated. In general, cotton and glass fibers are used.

Like any industrial material, coalescers do not achieve perfect separation or they may operate under degraded working conditions (very high flow rate, aging, fouling, etc.). A proportion of fine droplets can pass through the coalescent medium. The larger the number of small-size droplets at the equipment inlet, the larger this proportion.

In order to reach the content allowed by the fuel specification, the glycerin dissolved in the ester phase still has to be separated. This stage is carried out in zone (5) by adsorption on solids, for example ion-exchange resins. These solids operate by alternating adsorption and regeneration cycles. At the end of this stage, the glycerin content of ester phase I thus meets the fuel specification (below 200 ppm).

The final ester processing chain thus comprises a decanter (3) for separating the major part of the glycerin, a coalescer (4) intended for the insoluble residual glycerin and a solid adsorption zone (5) for separating the glycerin dissolved in ester phase I. The main separation stage takes place in the decanter, whereas the stages that are conducted in the coalescer or in the solid adsorption zone are finishing stages.

In the Esterfip-H™ process as described in the prior art, the solid adsorption zone using ion-exchange resins for example is in contact with part of the insoluble glycerin. Now, their use is all the more optimized as the proportion of insoluble glycerin to be separated from the ester phase is small. In the presence of too large an amount of glycerol and glycerin, the adsorbent solids tend to saturate more rapidly. The frequency of the adsorption/regeneration cycles increases. Regeneration is achieved using a solvent, preferably methanol. Now, repeated alternation of these cycles considerably reduces the life of the solids. For optimized operation of these solids, at the coalescer outlet, stream H should not contain more than 500 to 700 ppm mass of soluble glycerol.

The present invention thus provides a simple and improved flowsheet allowing the aforementioned drawbacks to be overcome and wherein the glycerin separation efficiency is markedly improved in the decanter. The efficiency of this decantation stage conditions the dimensioning of the facilities required for the next stages of the process. Thus, increasing the decanter efficiency allows to reduce the size of the coalescer and to increase the efficiency thereof. The amount or the cycle time of the solids used in the adsorption zone, ion-exchange resins for example, is thus increased.

SUMMARY OF THE INVENTION

The present invention describes a method of producing vegetable or animal oil alkyl esters and glycerin wherein separation between the ester phase and the glycerin is improved. The efficiency of the gravity decantation of small-size glycerin droplets is improved by means of a stage of recontacting with a glycerin phase, thus allowing their size to be increased and decantation to be facilitated.

The invention describes the facility wherein the method of producing vegetable or animal oil alkyl esters and glycerin with improved separation between the ester phase and the glycerin is carried out.

DETAILED DESCRIPTION

The present invention describes a method of producing fatty acid alkyl esters and glycerin implementing, in a reaction section, a set of transesterification reactions between a vegetable or animal oil and an aliphatic monoalcohol, and using a heterogeneous solid catalyst, comprising:
  a) a stage of recontacting the effluent coming from the reaction section, comprising alkyl esters, glycerol and partly converted triglycerides, and separated from the excess alcohol, with a glycerin phase of purity above 50% by mass,
  b) a stage of mixing said effluent with said glycerin phase, and
  c) a stage of decanting the glycerin phase and obtaining a supernatent ester phase.

At the end of this decantation stage, the ester phase obtained can be sent to one or more residual glycerin separation stages. Advantageously, this subsequent separation first takes place in a coalescer from which a glycerin phase and an ester phase greatly depleted in insoluble glycerin are extracted. The ester phase is then sent to at least one solid adsorption zone to separate the soluble glycerin and thus to obtain an ester phase meeting the fuel specifications.

The method according to the present invention thus allows to improve notably glycerin separation. This is due to the increase in the size of the droplets. According to the method of the invention, the decantation front separating the glycerin from the ester phase thus progresses more rapidly in the presence of added glycerin. In other words, the invention allows to optimize the decantation stage (decanter size, residence time, production) and also the possible subsequent residual glycerin separation stages according to the operator's needs.

Figure 2:
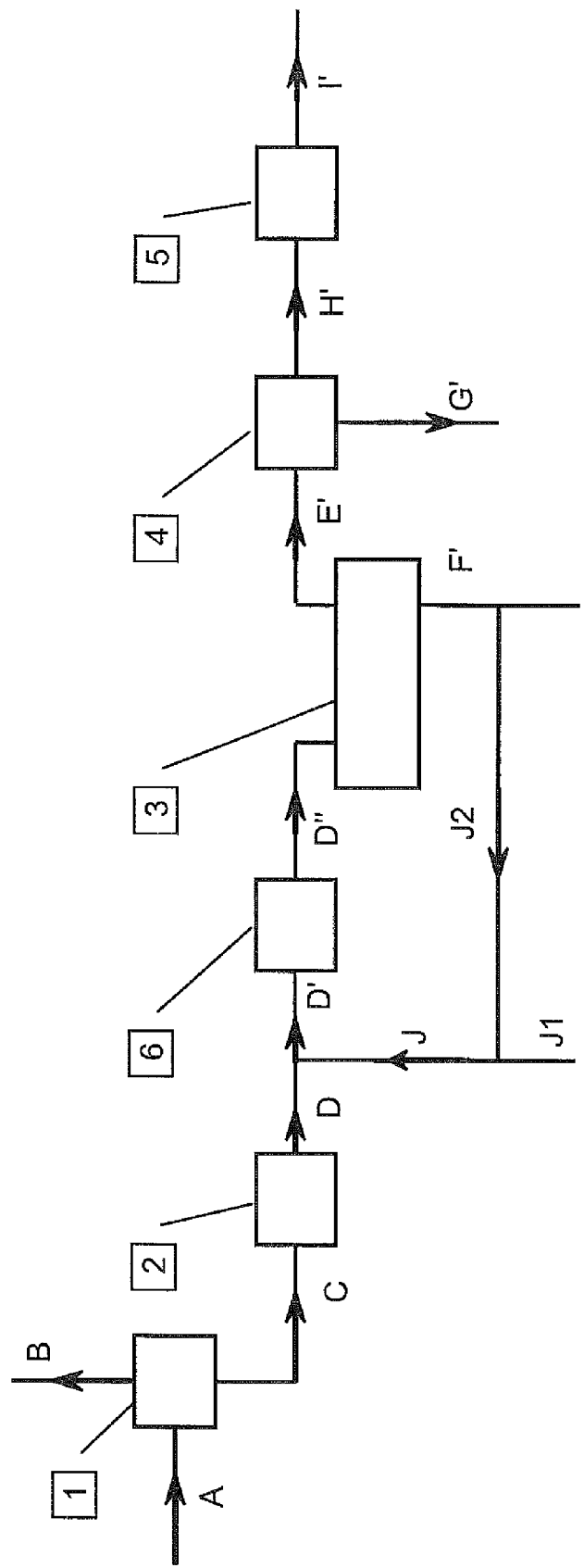

FIG. 2 shows a diagram of a particular embodiment of the improved method according to the present invention.

The facility wherein this embodiment is implemented comprises:
  a reaction section (not shown in the figure) at the outlet of which an effluent (stream A) comprising alkyl esters, glycerol, partly converted triglycerides and alcohol is obtained,
  an evaporation zone (1) allowing to separate the alcohol (stream B) and the effluent comprising alkyl esters, glycerol and partly converted triglycerides (stream C),
  a heat exchanger (2) allowing stream C to be cooled, at the outlet of which a stream D is obtained,
  a line through which a glycerin stream J is fed into stream D,
  a stream D and stream J mixing zone (6) at the outlet of which a stream D" is obtained,
  a decanter (3) allowing to separate the supernatent ester phase (stream E') and the glycerin phase (stream F'), and optionally a residual glycerin separation zone (4, 5).

Advantageously, this separation zone can be a coalescer (4) intended to separate the residual insoluble glycerin and/or a solid adsorption zone (5) intended to separate the soluble glycerol from the ester phase.

Stream A comes from the reaction section and it predominantly consists of alkyl esters, alcohol, glycerol and partly converted triglycerides. The stage carried out in zone (1) is a stage of evaporation of the excess alcohol. Stream C is then subjected to cooling in a heat exchanger (2) in order to decrease the proportion of glycerol dissolved in the ester phase. The recontacting stage is then carried out: a glycerin-enriched stream J is mixed with stream D coming from heat exchanger (2) and containing glycerin microdroplets.

This stream J represents 0.1 to 100% by volume of the flow rate of stream D corresponding to the effluent leaving the heat exchanger. Preferably, it represents 1 to 50% by volume of the flow rate of stream D.

Stream J contains at least 50% by mass of glycerol and preferably 75% by mass, more preferably 90% by mass of glycerol.

The glycerin used for this recontacting stage consists of streams J1 and/or J2.

Stream J1 corresponds to a glycerin phase from an exterior source, whose purity is above at least 50% by mass, preferably above 70% by mass and more preferably above 90% by mass.

Stream J2 corresponds to part of stream F' and it consists of glycerin whose purity is at least 50% by mass, preferably above 75% by mass and more preferably above 90% by mass, directly withdrawn from decanter (3).

More preferably, stream J comes entirely from the recycle (stream J2) of the glycerin withdrawn from decanter (3) and it represents part of stream F'.

Figure 3:
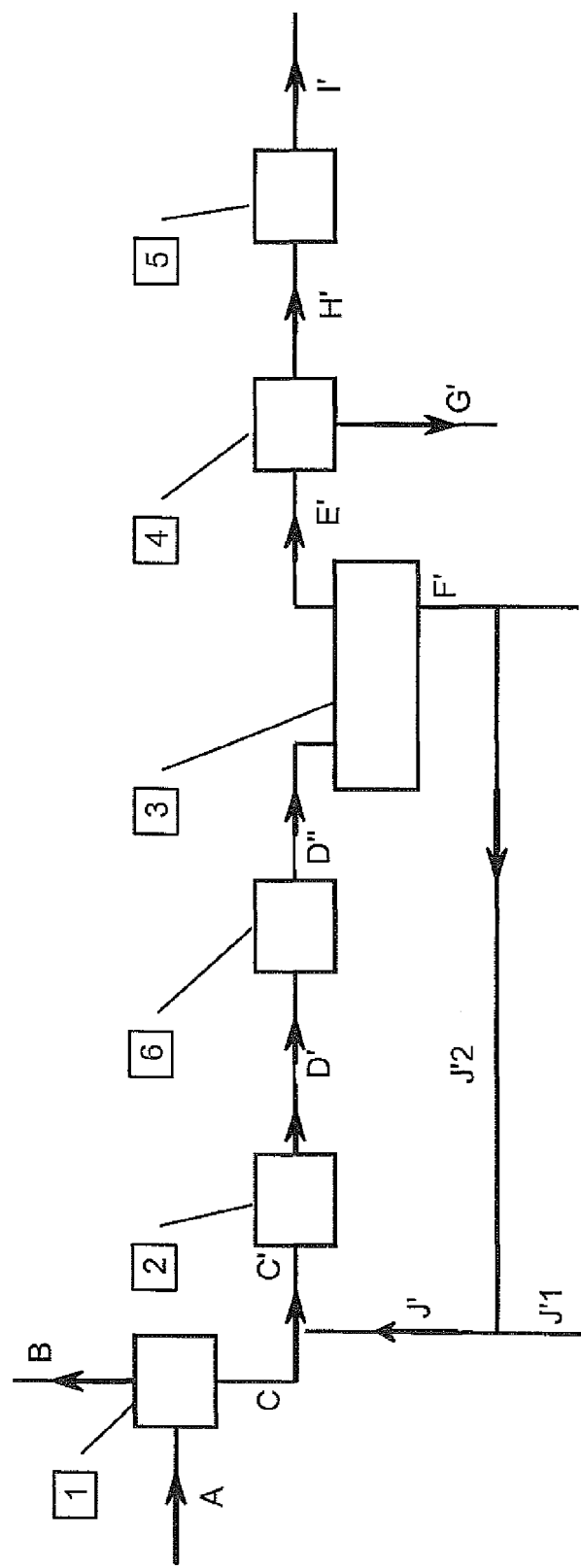

FIG. 3 shows another embodiment of the recontacting stage according to the invention, wherein said recontacting stage takes place upstream from heat exchanger (2).

The facility wherein this embodiment is implemented comprises:
  a reaction section (not shown in the figure) at the outlet of which an effluent (stream A) comprising alkyl esters, glycerol, partly converted triglycerides and alcohol is obtained,
  an evaporation zone (1) allowing to separate the alcohol (stream B) and the effluent comprising alkyl esters, glycerol and partly converted triglycerides (stream C),
  a line through which a glycerin stream J' is introduced,
  a heat exchanger (2) allowing stream C' consisting of streams C and J' to be cooled, at the outlet of which a stream D' is obtained,
  a mixing zone (6) for stream D' from heat exchanger (2), at the outlet of which a stream D" is obtained,
  a decanter (3) allowing to separate the supernatent ester phase (stream E') and the glycerin phase (stream F'), and optionally a residual glycerin separation zone (4, 5).

Advantageously, this separation zone can be a coalescer (4) intended to separate the residual insoluble glycerin and/or a solid adsorption zone (5) intended to separate the soluble glycerin from the ester phase.

Stream A from the reaction section, predominantly consisting of alkyl esters, alcohol, glycerol and partly converted triglycerides, is sent to zone (1) where the excess alcohol is evaporated. Glycerin stream J' is thus mixed with stream C directly obtained after excess alcohol evaporation stage (2).

This stream J' represents 0.1 to 100% by volume of the flow rate of stream C corresponding to the effluent leaving the heat exchanger. Preferably, it represents 1 to 50% by volume of the flow rate of stream C.

As in the embodiment described by FIG. 2, stream J' contains 50% by mass of glycerin, preferably 75% by mass, and more preferably 90% by mass of glycerin.

The glycerin used for this recontacting stage consists of streams J'1 and/or J'2.

Stream J'1 corresponds to a glycerin phase from an exterior source, whose purity is at least 50% by mass, preferably above 75% by mass and more preferably above 90% by mass.

Stream J'2 corresponds to part of stream F' and it consists of glycerin whose purity is at least 50% by mass, preferably above 75% by mass and more preferably above 90% by mass, directly withdrawn from decanter (3).

More preferably, stream J' comes entirely from the recycle (stream J'2) of the glycerin withdrawn from decanter (3) and it represents part of stream F'.

In the embodiment described in FIG. 2, the recontacting stage is preceded by a stage of cooling the stream coming from the reaction section and separated from the excess alcohol, whereas in the embodiment of FIG. 3, the recontacting stage is followed by this cooling stage.

The rest of the stages is then common to the two embodiments of the invention (FIGS. 2 and 3).

The mixture (stream D') consisting of the continuous ester phase with glycerin droplets containing added glycerin is sent to a static or dynamic mixer (6).

A static mixer is a device comprising many solid surfaces, generally fixed, the normals of these surfaces being in various directions in space so as to produce a flow with many orientation changes allowing the incoming streams to be mixed. The surfaces inside the static mixer can consist of the outer covers of particles of different shapes and sizes arranged in a generally circular pipe. They can also be baffles connected to the walls of the pipe, stacked packings of SMV® or SMX® type manufactured by the Sulzer Company.

A dynamic mixer is equipped with a rotor on which blades are arranged. An electric motor drives the rotor and thus the blades that therefore provide mixing of the streams entering the drum provided with this rotor.

The goal of this mixing stage is to generate, from the glycerin introduced, a significant amount of drops of sufficient size to provide easy decantation. The characteristics of the mixer are thus determined according to this constraint imposed on the size of the droplets. The probability of encounter between the glycerin microdroplets dispersed in the ester phase and the drops of sufficient size from the glycerin phase introduced during the recontacting stage is thus significantly increased. The drops then meet and merge or coalesce. Thus, the size of the resulting drop is larger than that of the two initial drops and it will therefore decant more readily.

One advantage of the present invention is that the size of the decanter is decreased by increasing the size of the droplets.

A glycerin stream F' is extracted from the decanter bottom while the ester phase is collected at the top of the drum (stream E').

According to the method of the present invention, stream E' as a result of the improved decantation, contains less glycerin carried along in the ester phase.

Advantageously, after the decantation stage, stream E' can be sent to a coalescer (4). Considering that glycerin decantation is improved, this equipment will be of more reduced size. A glycerin stream G' is withdrawn at the bottom point of the coalescer.

Ester stream H' extracted from coalescer (4), containing practically no and preferably no more insoluble glycerin, can be advantageously sent to zone (5) for an adsorption stage on solids. During this stage, the alternation of adsorption/regeneration cycles undergone by the solids is thus less frequent and their life is therefore increased. The solid regeneration stages are carried out with a lesser amount of solvent. The economy of the processing chain is thus greatly improved.

If decantation allows to separate a sufficient amount of insoluble glycerin, the ester stream from decanter (3) can then for example be advantageously sent directly to a solid adsorption zone (5) without requiring an additional coalescence stage.

Several measuring and/or calculating methods are necessary for characterizing the glycerin population in the ester phase from the drop size point of view.

When the ester phase only contains dissolved glycerol, it is completely limpid. When it contains insoluble glycerin droplets, it tends to become cloudy. It is thus possible to visually observe the limit between the cloudy phase and the limpid phase: this limit is defined as the decantation front. Monitoring of the decantation front and notably of the rate of displacement of this front allows to estimate the size of the drops present in the ester phase. A sample of an emulsion consisting of the continuous ester phase containing glycerin droplets is therefore placed in a graduated cylinder. Monitoring the displacement time of the decantation front allows to calculate a rate of displacement for this front. Standard values correlating the size of the drops and the rate of displacement of the decantation front allow to deduce the droplet sizes among the smallest ones.

Decantation times of the order of several hours imply very small drop sizes of the order of some microns.

Drop size measurements are also confirmed by optical microscopy, by arranging samples of the emulsion under a variable-power optical microscope. The various sizes of the glycerin droplets that coexist in the ester-glycerin mixture are thus directly measured. The sizes thus measured also allow to check the results obtained by monitoring the decantation front.

Complementary numerical fluid mechanics calculations allow to follow the trajectories of the droplets in the decanter drum. It is thus possible to estimate the separation efficiency of the decanter for the glycerin droplets flowing in with the ester stream. The size of the droplets being furthermore a parameter of the calculation, it can be varied until a separation corresponding to the separation really observed in the decanter is obtained.

EXAMPLE 1 (COMPARATIVE)

Figure 1:
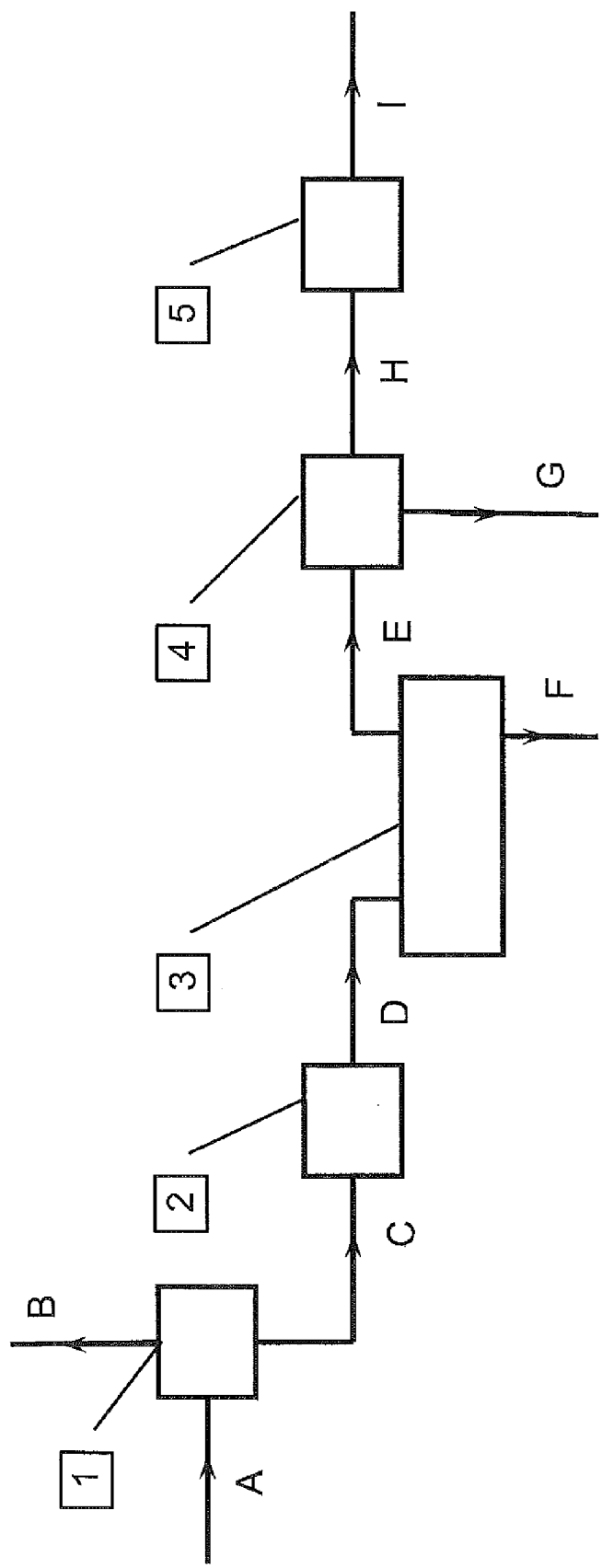
FIG. 1 diagrammatically shows part of the Esterfip-H™ process as described in the prior art, FIG. 2 diagrammatically shows part of the Esterfip-H™ process comprising the improvement provided according to the present invention, and FIG. 3 diagrammatically shows part of the Esterfip-H™ process according to a second embodiment of the present invention.

A sample A of the ester-glycerin mixture is taken after the excess methanol evaporation stage carried out at the reaction section outlet, and after the cooling stage (corresponds to stream D in FIG. 1). This sample comes in form of an emulsion.

A sample B is prepared in the laboratory by contacting 97% esters (biofuel meeting specifications) with 3% glycerin of purity of at least 97% by mass. One liter of the mixture is placed for 20 minutes in an IKA Ultraturrax type mechanical agitator rotating at 21,000 rpm.

The rate of fall of the glycerin drop in the continuous ester phase depends on various factors: the difference in density $\rho$ between the ester phase and the glycerin phase, the viscosity $\mu$ of the ester phase and the diameter d of the drop. The latter parameter related to the size of the drop is the most important because, for droplets of sufficiently small size, the decantation rate varies according to the square of the diameter.

The equation governing the "Stokes law" relative to the fall of a drop in a liquid medium is as follows (g being the acceleration of gravity) when the Reynolds number is below 0.3:

$$V = \frac{1}{18} \frac{d^2(\rho_{glycérine} - \rho_{ester}) * g}{\mu_{ester}}$$

The measurements taken on sample A directly obtained from the method according to the prior art and on sample B reproduced in the laboratory show that the decantation front moves 1.5 cm forward in 24 hours for both samples which, according to the Stokes law equation, corresponds to drops having a minimum size of 2 µm.

This example thus shows that it is possible to simulate the industrial problem in the laboratory.

EXAMPLE 2 (ACCORDING TO THE INVENTION)

A sample C is prepared in the same way as sample B by adding 25% by volume of glycerin of purity of at least 97% by mass. Mechanical stirring provided by the rotation of a propeller shaft at 450 rpm is applied to this 800-ml volume sample C for 15 minutes.

The same measurements taken on sample C as those taken on samples A and B show that the decantation front moves 20 cm forward in 10 hours. The smaller droplets have a diameter calculated by means of the Stokes law equation of 12 µm.

The progress of the decantation front is thus much more significant for sample C wherein recontacting with glycerin was carried out. It can thus be observed that the size of the droplets has increased after mixing with glycerin and stirring. In the presence of a larger amount of glycerin, the probability of encounter between a microdroplet with added glycerin is high, hence increased coalescence. Stirring also promotes these encounters by increasing the motion of the suspended droplets.

EXAMPLE 3 (ACCORDING TO THE INVENTION)

Tests were carried out on site with a 50-mm diameter column. The column was filled with glass balls that are 2 or 6 mm in diameter. The tests consisted in varying the flow rate of the emulsion comprising 4 mass % glycerin in ester while the flow rate of the glycerin used for recontacting was maintained constant at 58 kg/h. The flow was an ascending (UF) or a descending (DF) cocurrent flow.

Glycerin concentration measurements at the column inlet and outlet, performed on the ester phase after recontacting on the glass ball bed, allowed to estimate the recontacting efficiency expressed as follows:

$$\eta = \left(1 - \frac{C_{outlet}}{C_{inlet}}\right) \times 100$$

The table hereafter sums up the majority of the tests carried out:

| Emulsion flow rate kg/h | Flow type (DF or UF) | Balls diameter mm | Bed height in cm | Recontacting efficiency % |
|---|---|---|---|---|
| 153 | DF | 2.0 | 40 | 30 |
| 149 | UF | 6.0 | 130 | 31 |
| 150 | DF | 6.0 | 130 | 33 |
| 253 | DF | 2.0 | 40 | 35 |
| 36 | DF | 6.0 | 130 | 53 |
| 68 | UF | 2.0 | 130 | 53 |
| 70 | DF | 2.0 | 130 | 53 |

It can be observed that recontacting in the column clearly allows the amount of glycerin initially present in the emulsion to be decreased: the gains measured under the conditions given in the table range from 30% to more than 50%.

The invention claimed is:

1. A method of producing fatty acid alkyl esters and glycerin implementing, in a reaction section, a set of transesterification reactions between a vegetable or animal oil and an aliphatic monoalcohol, with a heterogeneous solid catalyst, said method comprising:
   a) a stage of recontacting a stream of effluent coming from the reaction section, comprising alkyl esters, glycerol and partly converted triglycerides, previously separated from excess alcohol, with a stream of a glycerin phase having a purity above 50% by mass,
   b) a stage of mixing said stream of effluent with said stream of glycerin phase, and
   c) a stage of decanting the glycerin phase and obtaining a supernatent ester phase.

2. A method as claimed in claim 1, wherein the recontacting stage is preceded by a stream cooling stage.

3. A method as claimed in claim 1, wherein the recontacting stage is followed by a stream cooling stage.

4. A method as claimed in claim 1, wherein the stream of added glycerin phase represents 0.1 to 100% by volume of the stream from the reaction section.

5. A method as claimed in claim 4, wherein said stream of glycerin phase represents 1 to 50% by volume of the stream from the reaction section.

6. A method as claimed in claim 1, wherein the glycerin phase used for the recontacting stage partly comes from a recycle of the glycerin withdrawn from the decanter.

7. A method as clamed in claim 1 further comprising withdrawing the glycerin phase from the decanter and recycling all of the withdrawn glycerin phase to the recontacting stage.

8. A method as claimed in claim 1, wherein the glycerin phase in the recontacting stage has a purity above 75% by mass.

9. A method as claimed in claim 1, wherein the mixing stage is carried out in a static mixer.

10. A method as claimed in claim 1, wherein the mixing stage is carried out with a dynamic mixer.

11. A method as claimed in claim 1 further comprising passing said supernatent ester phase to a coalescer (4) from which a glycerin phase is withdrawn at the bottom point thereof and an ester phase is withdrawn.

12. A method as claimed in claim 11, wherein the withdrawn ester phase is sent to a zone (5) for at least one adsorption stage on solids.

13. A facility for producing fatty acid alkyl esters and glycerin according to claim 1, said facility comprising:
   a reaction section having an outlet for effluent comprising alkyl esters, glycerol, partly converted triglycerides and alcohol,
   an evaporation zone (1) for allowing separation of an alcohol (stream B) and the effluent comprising alkyl esters, glycerol and partly converted triglycerides (stream C),
   a heat exchanger (2) allowing stream C to be cooled, at the outlet of which a stream D is obtained,
   a line through which a glycerin stream J is fed into stream D,
   a stream D and stream J mixing zone (6) at the outlet of which a stream D" is obtained,
   a decanter (3) allowing to separate the supernatent ester phase (stream E') and the glycerin phase (stream F'), and
   optionally a residual glycerin separation zone (4, 5).

14. A facility for producing fatty acid alkyl esters and glycerin according to claim 1, said facility comprising:
   a reaction section having an outlet for obtaining an effluent comprising alkyl esters, glycerol, partly converted triglycerides and alcohol,
   an evaporation zone (1) for separating the alcohol (stream B) and the effluent comprising alkyl esters, glycerol and partly converted triglycerides (stream C),
   a line through which a glycerin stream J' is introduced,
   a heat exchanger (2) allowing stream C' consisting of streams C and J' to be cooled, at the outlet of which a stream D' is obtained, a mixing zone (6) for stream D' from heat exchanger (2), at the outlet of which a stream D" is obtained, a decanter (3) for separating the supernatent ester phase (stream E') and the glycerin phase (stream F'), and optionally a residual glycerin separation zone (4, 5).

15. A facility as claimed in claim 14, comprising the separation zone, the latter comprising a coalescer (4) and/or a solid adsorption zone (5).

16. A facility as claimed in claim 13, wherein the line through which a glycerin stream J is fed into stream D is supplied by the glycerin phase (stream F').

17. A facility as claimed in claim 14, wherein the line through which a glycerin stream J' is introduced is supplied by the glycerin phase (stream F').

* * * * *